No. 12,490. REISSUED MAY 29, 1906.

J. K. LUX.

CONTROLLING MEANS FOR ELECTRIC CIRCUITS.

APPLICATION FILED APR. 5, 1906.

3 SHEETS—SHEET 1.

Witnesses

Jas. E. Hutchinson.

C. A. Ernest

Inventor

Julius K. Lux.

No. 12,490. REISSUED MAY 29, 1906.

J. K. LUX.

CONTROLLING MEANS FOR ELECTRIC CIRCUITS.

APPLICATION FILED APR. 5, 1906.

3 SHEETS—SHEET 2.

Witnesses

Jas. E. Hutchinson

Wm. L. Morris

Inventor

Julius K. Lux.

No. 12,490. REISSUED MAY 29, 1906.

J. K. LUX.

CONTROLLING MEANS FOR ELECTRIC CIRCUITS.

APPLICATION FILED APR. 5, 1906.

3 SHEETS—SHEET 3.

Witnesses
B. M. Offutt,
G. M. Spring.

Inventor
Julius K. Lux

UNITED STATES PATENT OFFICE.

JULIUS K. LUX, OF ST. LOUIS, MISSOURI.

CONTROLLING MEANS FOR ELECTRIC CIRCUITS.

No. 12,490. Specification of Reissued Letters Patent. Reissued May 29, 1906.

Original application filed June 3, 1897, Serial No. 639,230. Divided and application filed June 25, 1903. Original No. 761,003, dated May 24, 1904. Application for reissue filed April 5, 1906. Serial No. 310,194.

*To all whom it may concern:*

Be it known that I, JULIUS K. LUX, a citizen of the United States, residing at St. Louis, in the State of Missouri, have invented certain new and useful Improvements in Controlling Means for Electric Circuits, of which the following is a specification.

This application is a division of my application, Serial No. 639,230, filed June 3, 1897.

The principles of my invention are embodied in the form of a four-terminal or double-pole snap-switch.

Figure 1:
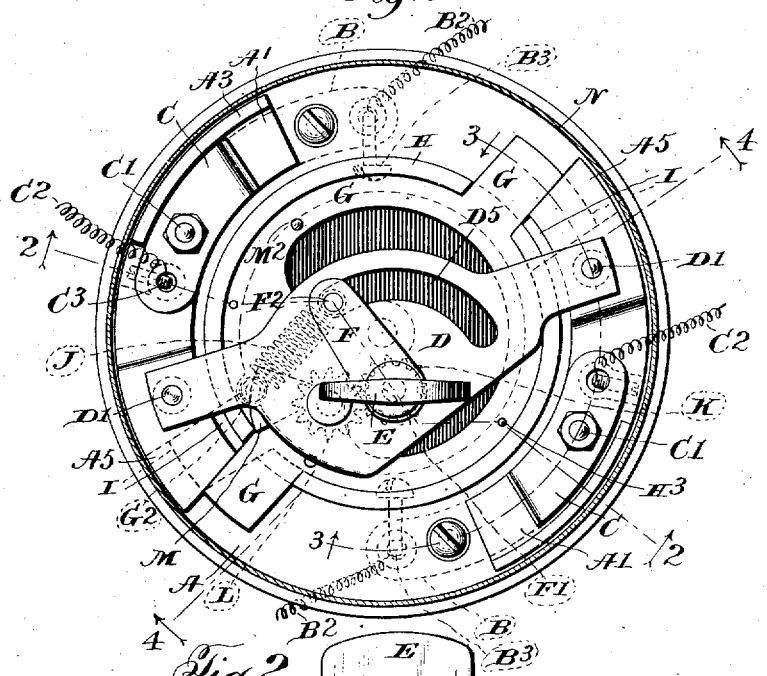
Figure 2:
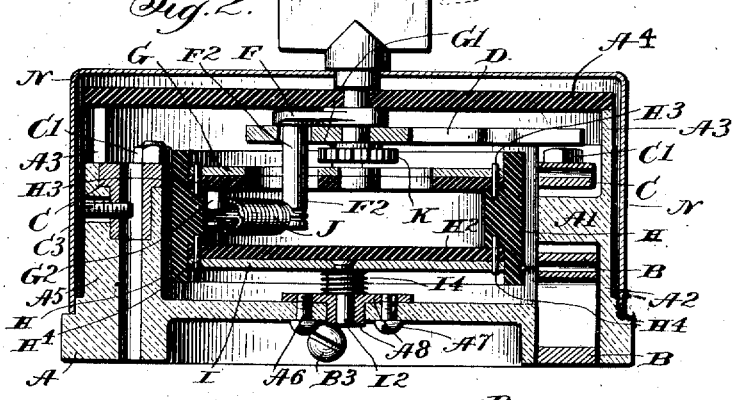
Figure 3:
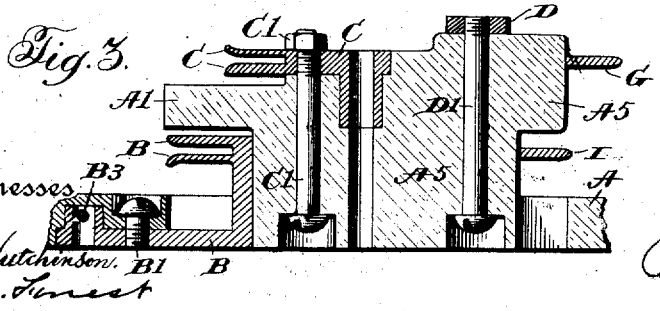
Figure 4:
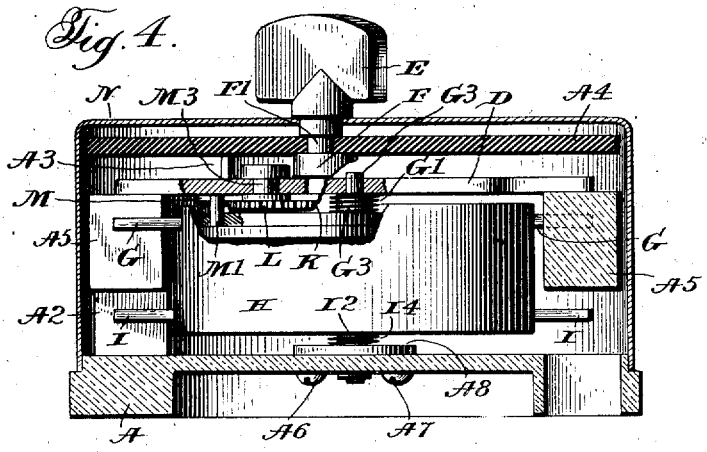
Figure 5:
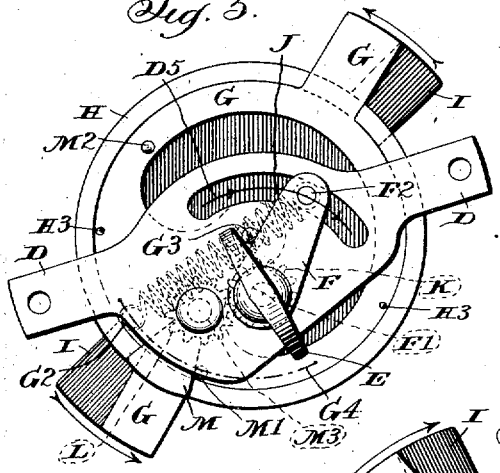
Figure 6:
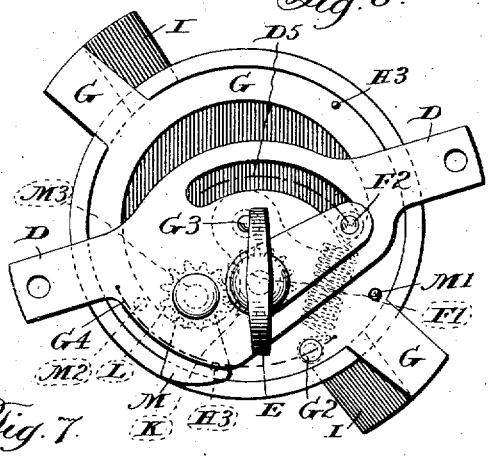
Figure 7:
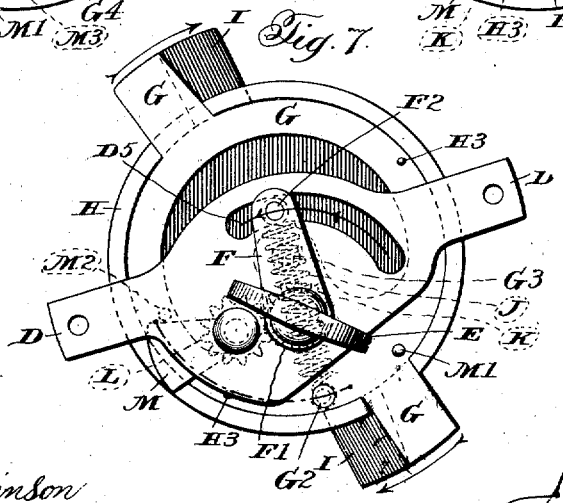
Figure 8:
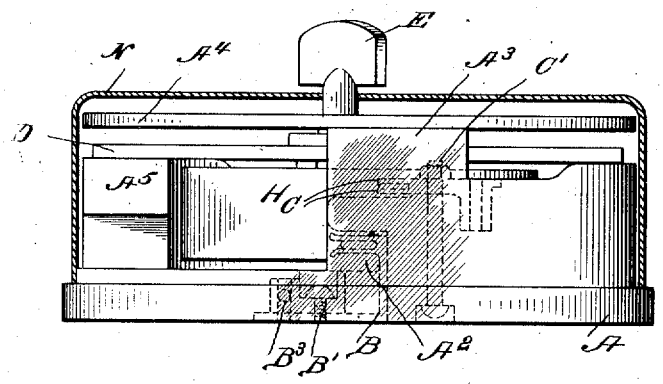

Figure 1 is a plan view of an electric switch embodying my improvements. Fig. 2 is a sectional view approximately on line 2 2 of Fig. 1 looking in the direction of the arrows. Fig. 3 is a detailed sectional view showing the blades of the contacts in their open position. Fig. 4 is a sectional view of the porcelain parts approximately on line 4 4 of Fig. 1 looking in the direction of the arrows, other parts being shown in elevation and partly broken away to more clearly show the arrangement. Fig. 5 is a view of the operating mechanism, showing the energizing and spring-conveying means turned to the right from the position shown in Fig. 1, the actuator M having turned the movable contact from position shown in Fig. 1. The actuating-spring is approximately at that dead-center which obtains in the closing-movement. Fig. 6 shows the conveyer at its extreme right position. The movable contact has turned in a direction the reverse to that of the energizing means to that home position which is opposite to that shown in Fig. 1. Fig. 7 shows the parts in the return movement from that position shown in Fig. 6 to the position shown in Fig. 1 and with the actuating-spring about at the dead-center which obtains in the opening movement. Fig. 8 is an elevation view, partly in section, of parts of the mechanism, more clearly showing the insulation features.

Referring to the drawings in detail, A indicates the base, made of porcelain or other suitable material. The said base and the hereinafter-described bearing-piece D support the various elements of the device.

$A^8$ indicates a bearing-piece for one of the journals of the hereinafter-described movable contact. The said bearing-piece is secured in position by the screws $A^6$ $A^7$.

$A^5$ $A^5$ indicate posts extending upwardly from the base. The said posts are diametrically opposite each other and support the fixed contacts C C and the bearing-piece D. The said posts are undercut on the side circumferentially behind the contacting surfaces of the fixed contacts to allow the movable contact I to pass partially under the said posts $A^5$ $A^5$ to make a one-quarter revolution from its closed position, as shown by the dotted line in Fig. 1. That portion of the upper surface of the base A which lies under the path of the movable contact, as is clearly shown in Fig. 4, will in the claims be designated as the "central" portion of the base.

A′ A′ indicate tongues of insulating material extending from the said posts $A^5$ $A^5$. The said tongues are substantially both parallel to the said base and concentric to the center thereof. They are adapted to interrupt the arc that may form between the upper and lower fixed contacts when a circuit is broken.

$A^2$ $A^2$ indicate webs of insulating material, and they connect the outer edges of the tongues A′ A′ to the base.

$A^3$ $A^3$ indicate webs of insulating material extending upwardly from the posts $A^5$ $A^5$ and from the tongues A′ A′. The webs $A^2$ and the walls $A^3$ each contribute to prevent the formation of an arc between the fixed contacts and the metallic cover or case N when the circuit is being broken.

$A^4$ indicates a disk of insulating material, and it rests upon the walls $A^3$ $A^3$.

C C indicate fixed contacts which are secured to the posts $A^5$ $A^5$ by means of bolts C′ C′, which latter are inserted from the under side of the base, as is usual. The said fixed contacts are provided with means for receiving the conductors $C^2$ $C^2$, which latter are held in position by the binding-screws $C^3$ $C^3$.

B B indicate fixed contacts, which are placed under the arc interrupting tongues A′ A′. The said fixed contacts extend through the base and then forwardly for a short distance, where they are secured to an under surface of the said base by means of the screws B′ B′, as shown in Fig. 3. The said fixed contacts are provided with means for receiving the conductors $B^2$ $B^2$, which latter are held in position by the binding-screws $B^3$ $B^3$.

The fastening of the contacts C C extend circumferentially backward or in the opposite directions from their respective contacting surfaces, while the fastenings of the contacts B B extend circumferentially forward or in the same direction as their respective contacting surfaces. This construction separates the fastenings of the contacts C from the fastenings of the contacts B and reduces the liability of a "short circuit" between the said fixed contacts or the conductors which may be secured thereto. If the contacts B B were fastened at the major upper surface of the base, an arc could jump from the fixed contact-brush to that part of the contact which extends circumferentially forward and follow the movable contact during part of its opening movement. To obviate this, I fasten the said contacts below the major upper surface of the said base and preferably to an under surface thereof. The said contacts B B and C C coöperate with the hereinafter-described contacts G and I.

D indicates a bearing-piece for moving parts of the device. The said bearing-piece is superimposed over the movable contact, which feature permits of the improved arrangement of the moving parts and of their axes. The movable contact, the actuating-spring, and the spring energizing and conveying means are brought much closer together and made more compact, serviceable, and effective than has been usual. It also affords an outbearing or outer bearing for one of the herein-described operative connections of the yielding actuating means. It has been usual to support that connection with a pivot and shoulder bearing—that is, with a cylindrical journal—and also with a flat surface bearing within the outer circle or circumference of the said cylindrical portion. A cramping or binding stress exists and inheres in such a bearing, which is analogous to that of the herein-described tilting stress on the movable contact. The operative connection of the yielding actuating with the energizing means is supported in proximity or juxtaposition to that connection and at two sides of the radius or line of movement thereof. A running or sliding bearing is formed, which is preferably as remote from the said pivot and shoulder bearing as is the said operative connection of the yielding actuating means. The support D, the slot $D^6$, and the shiftable bearing of the spring connection $F^2$ form a new means for shiftably bearing one of the operative connections of the yielding actuating means. This new bearing is an important improvement. It permits of a great increase in the spring's power without cramping whatsoever. The said bearing-piece is mounted on top of the posts $A^5$ $A^5$ and behind the contacts C C, where it is secured by means of the bolts D′ D′. If the actuating-spring be disposed at one side of a journal (for the movable contact) a tilting, cramping, binding stress is developed at the said journal. If the said spring be disposed at one side of the movable contact, a lateral or binding stress is developed at the contacting surfaces, due to the impulse of the spring and the opposing or retarding influence of the fixed contact.

H indicates a drum-shaped separator. It separates the journals and the upper from the lower movable contacts and allows the actuating-spring to exert its stress in a plane situated between the said journals and also between the said movable contacts, thereby eliminating all tilting or cramping stress. The said separator may be made of metal—as, for example, in a single-pole switch—with the wires of opposite polarity at the same side of the axis, as hereinafter described. It may consist of one or more studs or posts; but when formed as a continuous band or hollow drum it has greater stability, particularly when it insulates one contact from another. The said separator has ends or heads H′ and $H^2$, which heads are sunk into the ends of the drum-shaped portion, as shown in Figs. 2 and 4. G and I indicate the movable contacts. They have disk-shaped central portions, which are placed against the outer faces of the heads H′ and $H^2$. The contacting surfaces of the said movable contacts extend through notches formed in the ends of the separator H, and the said contacting surfaces are in position to come into engagement with the fixed contacts C C and B B, respectively. The contacting surfaces of the rocking movable contact are disposed at both sides of a plane in which the stress of the actuating-spring resides and moves. By this arrangement the retardation of the movable contact due to impact or friction with the fixed contacts is divided or balanced as required to reduce or eliminate that lateral cramping stress on the movable contact, which would result were that retardation which is due to the fixed contact wholly at one side of the said plane of spring stress. The contact G and the above-mentioned head H′ are each cut away or pierced to permit the passage of a suitable connection between the actuating-spring and the energizing means. The arrangement of the energizing means over one movable contact with the actuating-spring under the same adds to that compactness of structure whereby better alinement of the parts is maintained and the effectiveness of the device is enhanced. The ends of the separator H are raised above the central portions of the contacts G and I, and the said ends tend to interrupt the arc that may form when a circuit is being broken. The said part H provides a barrier of insulation about the movable contacts, allowing only the extremity of the latter to be exposed to the fixed terminals of the device. It also forms a continuous wall or barrier at the inner side of the herein-described segmental arc-restricting inclosures or channels and restricts arcing when a circuit is broken.

The movable barrier H, together with the stationary barriers juxtaposed below, radially beyond and above the path traveled by the free end of the movable contact provides a restricted passage-way or channel with an opening at the inner side on a portion of the path of the movable contact immediately it leaves the fixed contact.

A sustained air-space between the movable member and the fixed barriers $A'$, $A^2$, $A^3$, and $A^4$ is a feature of this invention. By means of said air-space the stationary barriers are made serviceable in devicees of this species, non-rubbing of the parts being essential in snap opening and closing switches. The said air-space may be greater for some classes of service and less for other classes of service. The said spacing, and particularly the larger ones, lessening the cost of production by reducing the nicety or precision of adjustment and fitting. The baking of the porcelain (of which refractory insulation parts are usually made) always warps the switch parts made of that material. Hence the fitting of extended barriers very close to the movable contact would be an exceedingly troublesome and unsatisfactory proceeding requiring great care and precision. Otherwise such barriers would interfere with the movable member and prevent the free snap opening and closing of the circuit. Extended barriers would be more easily damaged or destroyed and are also costlier to manufacture than shorter barriers. The said barriers are also designed and arranged to prevent the accumulation or lodgment of foreign matter, which sometimes results from wear of rubbing parts, and unfavorable results arising from condensation or moisture and from changes in temperature are provided against by the non-rubbing juxtaposition of the insulation parts. For the herein-described reasons a greater number of shorter barriers is better practice than a less number of extended barriers. The raised ends of the insulation part H also cause the movable contacts and the separator to move together. The pivots $G^3$ and $I^2$ are alike in all essentials and extend in opposite directions outwardly from the movable contacts G and I, respectively. The pivot $G^3$ is journaled at the center of the bearing-piece D. The pivot $I^2$ is journaled in the bearing-piece $A^8$ at the center of the base A, thus allowing the movable member to bear or carry the contacting surfaces to and from the fixed contacts. The guide-pins $H^3$ $H^3$ are inserted through the movable contact G and fixed in the separator H. The guide-pins $H^4$ $H^4$ are analogous to the said pins $H^3$ and extend through the movable contact I. The said guide-pins allow the movable contacts to slide to and from each other and to accommodate themselves to irregularities of construction and to the position of the fixed contacts. The said guide-pins also cause the movable contacts and the separator to move together. The said part H provides a barrier of insulation about the movable contacts, exposing only the extremities thereof to the fixed conductive parts of the device. It also forms a continuous wall or barrier at the inner side of the herein-described arc-restricting inclosure or channel or restricted passage-way and restricts arcing when a circuit is broken. The movable barrier H, together with the stationary barriers disposed above, below, and radially beyond and in juxtaposition to the path traveled by the movable contact when a circuit is broken, shut in the said movable contact and a segmental section of the path of its snap-turning movement on all but one side, and the said inclosure restricts arcing, so that it is not liable to occur. The spring $G'$ is placed upon the pivot $G^3$ between the fixed support D and the movable contact. The said spring $G'$ holds the movable contact G against the separator and allows the said movable contact to adjust itself to the fixed contacts C C. The spring $I^4$ is placed on the pivot $I^2$ between the bearing-plate $A^8$ and the movable contact I. The functions of the spring $I^4$ are analogous to those of the above-mentioned spring $G'$. The pin $G^2$ extends inwardly from the contact G and the head $H'$ at a point near the periphery of the former. One end of the actuating-spring J is connected to the said pin $G^2$.

F indicates means for energizing and shifting the actuating-spring J. It is fixed upon the snaft $F'$, which shaft is journaled in the bearing-piece D. The pinion K is fixed upon the inner end of the said shaft $F'$ and is in mesh with the pinion L. The pin $F^2$ extends from the free end of the spring energizing and conveying means F through the bearing-piece D by way of the concentric slot $D^5$ and through the above-mentioned openings in the movable contact G and the head $H'$. The remaining end of the actuating-spring J is connected to the inner end of the said pin $F^2$ under the movable contact G and in the interior of the movable circuit-controlling member. The handle E is fixed to the outer end of the shaft $F'$.

N indicates a metallic casing or cover which fits over the base and incloses the moving parts.

J indicates the yielding actuating means or spring. One end thereof is connected to the movable contact at $G^2$, and the other end is connected to the energizing and shifting means at $F^2$. The preferred form of actuating-spring is of the retractile coiled form shown, and it crosses or passes the line of axis of the movable contact and the line of axis of the energizing means at each operation of opening or closing the device. I desire it understood, however, that other forms of yielding actuating means may be used and that my improvements are applicable to all circuit-controlling devices wherein yielding actuating means urge coöperating electrical contact together and apart, so as to effect quick snap actions. In some forms of switches it is essential that the springs do not cross the line of axis of the movable contact. It has been usual to supply the movable contact in those forms of devices with plural journals.

My improved arrangement of journals with relation to the actuating-spring extends the advantages of plural journals to that other class of devices wherein it is essential that the yielding actuating means or the stress thereof cross the line of axis of the movable contact. I desire to call special attention to the arrangement, the movement, and the delivery of the said spring. If, as has been usual, but one journal is used, then when the actuating-spring or the stress thereof nears the line of dead-center it tends to tilt the movable contact sidewise out of its true plane of rotation, thus producing cramping or binding and increased journal friction, or the said tilting is productive of a sliding shoulder or bearing, thus retarding the free movement of the movable contact about its axis. An increase in the power of the aid actuating-spring, owing to the leverage, will cause a greater proportionate increase in the retardation. The arrangement of the journals on either side of the plane of stress of the actuating-spring eliminates the said undue friction at the journals. An increase in the number or power of the actuating-springs will not produce the increased retardation above referred to. In other words, the operative connection of the yielding actuating means with the movable contact has plural bearings arranged to cause the said yielding means to pass between them, so as to keep the said connection in its true line of movement without cramping. In the closing movement of the device the fixed contacts act as a cushion or buffer by reason of the sliding or rubbing contact; but in the opening movement the movable contact opens with a hammer-like blow on the stop or other parts that limit the said movement, and that (increased) power which is desirable in the closing movement is objectionable and detrimental in the opening movement of the device. When the opening and closing powers are alike, each of the said two powers and their mean or average are the same (given) quantity. My improved arrangement subtracts from the said given quantity in the opening movement and adds to the said given quantity in the closing movement of the device. The said arrangement develops more power in the closing and less power in the opening of the device than the mean or average power of the combined opening and closing movements. The point of connection of the actuating-spring J with the movable contact swings or travels back and forth about the axis of the movable contact. A plane in which the line of the said axis is and which plane bisects equally the path of the said travel is the plane of equal stress—that is, if the axis F′ be located in the said plane the energizing means will develop equal spring power in both the opening and closing operations of the device. It has been usual to locate the axis of the energizing means in the said plane of equal stress, thus developing equal spring power on the movable contact in either direction. To increase the closing power, (without increasing the opening power,) I locate the axis of the energizing means at one side of the said plane of equal stress.

In my improved device the pin $F^2$ and also the line of stress of the actuating-spring J are each delivered farther from the line of axis of the movable contact when the device is closed than would be the case if the axis of the energizing means were located in the said plane of equal stress. The said closed position of the pin $F^2$ increases the stress of the said spring. The said closed position of the spring J improves the angle or position of effectiveness of the spring stress, and thereby increases the effectiveness on the movable contact of a given spring stress or force. The course traveled by the pin $F^2$ increases the power of the actuating-spring during the operation of closing the device. The said increased stress resulting from the delivery of the pin $F^2$, the said improved angle of stress, and the said course traveled by the pin $F^2$ each contribute to the more effectual engagement of the movable with the fixed contacts. The said increased closing power obtains with the same spring and moving parts and without increasing the dimensions of the device. It will also increase the carrying capacity of the device by improving or increasing the electrical contact. Conversely, the said pin $F^2$ and also the line of stress of the actuating-spring are each delivered nearer the line of axis of the movable contact when the device is opened. This open position of the pin $F^2$ decreases the stress of the said spring. This open position of the spring J impairs the angle of the effective spring stress, and thereby decreases the effectiveness on the movable contact of a given spring stress or force. The course traveled by the pin $F^2$ decreases the power of the actuating-spring during the operation of the opening of the device. The decreased spring stress resulting from the said delivery of the pin $F^2$, the said impaired angles of stress, and the said course traveled by the pin $F^2$ each contribute to reduce needless strain or shock to the parts in the operation of opening the device.

It is not essential that all of the herein-described means be jointly used to obtain the powers described. Whether expressed in terms of power or potency, which, as herein used may be synonymous with effectiveness and efficiency or in terms of stress and energy, which, as herein used may be synonymous with quantity and whether the departures from (the heretofore usual) equal powers be influenced by changing either the opening or closing powers, or both, or the opening or closing energies, or both, the essential which is claimed to be broadly new is that the circuit be closed with more yielding power than is used to open it. To these three factors for reducing the strain or shock in the opening movement may be added another factor—namely, the coöperative actuating means or positive mechanical actuator M, which extends from the pinion L. The said actuator, however, may perform its herein-described functions irrespective of any specific location of the axis F'.

M' and $M^2$ indicate pins projecting from the movable contact, and they are in position to be engaged by the actuator M, respectively, in the closing and opening operations of the device. If the pin $G^2$ remained stationary and the pins $F^2$ be turned until the spring J is near the line of axis of the movable contact, the said spring is under needless and ineffective stress which is not available or effective until the stress of the said spring is delivered past the said line of axis. This non-propulsive stress is greatest in the closing movement. In the closing movement the actuator M propels the spring connection $G^2$ before the dead-center is reached to prevent overstraining the actuating-spring. In the opening movement the actuator M propels the said spring connection before and after the dead-center is reached, so as to reduce the opening power of the actuating-spring. Increased power when closing occasions increased adhesion or retardation of the contacting surfaces. When opening the device, the reduced opening power of the actuating-spring adds to the difficulty. The actuator M assists the actuating-spring and makes positive the disengagement of the contacts in the opening movement. The arrangement and direction of movement of the actuator M relatively to the energizing means enables the improved arrangement of the axis of the latter means with relation to the axis of the movable contact, whereby a movement of ninety degrees is given to both the energizing means and the movable contact with the desired spring stress and effectiveness thereof when the device is closed and with a separation or "break" of ninety degrees between the coöperating contacts when the device is opened. The said direction of movement of the actuator relatively to the energizing means, taken with the loose connection between those parts and the movable contact, enables the positive action of the actuator together with the snap action of the movable contact unretarded by the handle. The arrangement of the axis F' increases the closing power; but it also increases the non-propulsive stress of the yielding actuating means before the dead-center is passed. Therefore the spring when developing its maximum power may not have its said power doubled by a requisite increase in the size of the wire and be operative. Such an increase in the size of the wire could give double the power; but it would be too stiff to pass the dead-center without permanently impairing the spring. While a spring could be made with the first indicated elasticity and double the power, it would be very much too large to be used in a switch of the same size. To add to the maximum closing power of the yielding means J and retain the given circumference, I supply another individual actuating means. This division or pluralizing of the yielding actuating means integrates with that arrangement whereby the herein-described increased closing stress is obtained, so as to supplement or add to that power without increasing the radius of the yieldingly-connected points, the increased stress in the closing movement notwithstanding.

In my applications, Serial No. 639,230, filed June 3, 1897, Serial No. 18,049, filed May 26, 1900, and Serial No. 63,322, filed June 5, 1901, I have shown and described constructions wherein a plurality of yielding actuating means is used to supplement the maximum power of one yielding actuating means, substantially as and for the purposes herein set forth.

I have elected to embody in this case all broad or generic claims covering the insulation barrier features and the means for closing a snap-switch with greater power than is used in opening the same.

I desire it to be understood that the several influences or means or arrangements thereof which help or contribute to the results herein described may be used severally or collectively. When the device is open, the movable parts are in the position shown in Fig. 1, with the spring J under moderate stress. To close the device, the energizing means F is turned to the right and the actuator M is brought into engagement with the movable contact at the pin M'. As the free end of the energizing means F is turned in one direction the actuator M turns the movable contact in an opposite direction. Continued movement of the said parts carries the actuating-spring J past the line of axis of the movable contact, which having been past the stress of the said spring causes the movable contact to travel the balance of its stroke or movement under the impulse of the said spring, said impulse likewise causing the said energizing means to complete its stroke in the absence of power applied to the handle E. When the device is closed, the energizing means is in its other home position, the spring J is at the reverse side of the said line of axis, and the movable contact has turned in a direction the reverse of clockwise to the position shown in Fig. 6, leaving the spring J again under moderate stress. To open the device, the operation is reversed. The actuator engages the movable contact at the pin $M^2$ and propels that end of the actuating-spring which is connected with the movable contact first toward and then from the dead-center, thereby diminishing the spring stress. The movable contacts are wholly disengaged from the fixed contacts after the actuating-spring is in position to effect a snap opening of the device without undue jar or shock to the parts.

The device may be connected in an electric circuit in several ways. The positive wire from the source of electricity may be secured to a lower fixed contact B, and the negative wire from the same source may be secured to the upper fixed contact C on the same side of the base, the lamp, or other contrivance that is to receive the current to be similarly connected to the remaining contacts B and C. This method of connecting the device in the circuit discloses the importance of the spark-interrupting tongues, webs, and walls above described. The construction herein set forth prevents short-circuiting when a circuit is being broken if the device is connected as above described, either by inadvertence or design. The device may also be connected in circuit by securing the positive wire from the source of electricity to a lower fixed contact B and the negative wire from the same source to the upper fixed contact C on the opposite side of the base, the lamp or other contrivance that is to receive the current being similarly connected to the remaining contacts B and C.

I claim—

1. In a snap opening and closing circuit-controlling device, a suitable support, an electrical contact carried thereby, a movable electrical contact adapted to coöperate with the first-mentioned contact, and means for actuating said movable contact and for effecting a more powerful snap action in closing said contacts than in opening the same.

2. In a snap opening and closing circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, means for relatively moving said yieldingly-connected parts in a manner to provide a greater contact-actuating potency to close the circuit than is used to open the same.

3. In a snap opening and closing circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, means for relatively moving said yieldingly-connected parts to provide a greater contact-actuating energy to close the circuit than is used to open the same.

4. In a snap opening and closing circuit-controlling device, a suitable support, an electrical contact carried thereby, a movable electrical contact adapted to coöperate with the first-mentioned contact, movable operating means, connections between said movable contact and said operating means consisting of a lever in connection with the one, and a yielding actuator in connection with the other and with the said lever, means for shifting the leverage of said yielding means on said lever to cause the yielding means to exert a greater actuating potency on the movable contact in closing than in opening the contacts.

5. In a snap opening and closing circuit-controlling device, a suitable support, an electrical contact carried thereby, a rotary electrical contact adapted to coöperate with the first-mentioned contact, yielding actuating means operatively connected with the said rotary contact, a rotary energizing means with which the said yielding actuating means is also operatively connected, the axes of rotation of said rotary and said energizing means being eccentrically disposed, whereby the actuating potency of said yielding means is greater in closing than in opening said contacts.

6. In a snap opening and closing circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, said energizing means turning about an axis located to one side of a plane in which the axis of the said rocking contact lies, which plane bisects equally the line of movement of the point of connection of the said rocking contact with said yielding means, by means of which axial arrangement less yielding stress is developed in the opening than in the closing operation of the device.

7. In a circuit-controlling device, a suitable support, an electrical contact carried thereby, a rocking electrical contact adapted to coöperate with the first-mentioned contact, yielding actuating means operatively connected with the said rocking contact, movable energizing means with which the said yielding actuating means is also operatively connected, and means whereby said yielding connections have a movement with a dead-center toward which the said tension increases to provide a snap opening and closing thereof, and means for moving the points of connection of the yielding means with the said energizing and contacting means with relation to the axis of the rocking contact so that the line of stress of the said yielding means is nearer the line of the said axis when the device is open than when the same is closed.

8. In a circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, said yielding connections effecting a movement with a dead-center toward which the yielding stress increases to produce a snap opening and closing thereof, the said two yieldingly-connected points having movement such that the points are farther apart when the device is closed than when the same is open.

9. In a snap opening and closing circuit-controlling device, a suitable support, an electrical contact carried thereby, a movable electrical contact adapted to coöperate with the first-mentioned contact, yielding actuating means operatively connected with the said movable contact, a movable energizing means with which the said yielding actuating means is also operatively connected, and means for giving one of said yieldingly-connected parts a path of movement divergent from the other to provide said yielding connection with greater actuating potency in closing than in opening the contacts.

10. In a circuit-controlling device, a suitable support, an electrical contact carried thereby, a rocking electrical contact adapted to coöperate with the first-mentioned contact, yielding actuating means operatively connected with the said rocking contact, movable energizing means with which the said yielding actuating means is also operatively connected, means whereby said yielding connections have a movement with a dead-center toward which the said tension increases to provide a snap opening and closing thereof, the point of connection of the yielding means with the energizing means having such movement with relation to the axis of the movable contact that said point of connection is nearer said axis when the device is open than when the device is closed.

11. In a snap opening and closing circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, means for giving one of said yieldingly-connected parts a greater movement than the other to provide greater contact-actuating potency in closing than in opening the contacts.

12. In a snap opening and closing circuit-controlling device, a suitable support, an electrical contact carried thereby, a rocking electrical contact adapted to coöperate with the first-mentioned contact, yielding actuating means operatively connected with the said rocking contact, a plurality of bearings for one of said connected parts, the actuating means being disposed with relation to the movable contact to cause the actuating stress thereof to fall between the plural bearings, and means for energizing said actuating means and for moving the same in a manner to throw the stress thereof from one to the other side of the axis of the contact.

13. In a circuit-controlling device, a suitable support, an electrical contact carried thereby, a rocking electrical contact adapted to coöperate with the first-mentioned contact, a plurality of bearings for said movable contact, yielding actuating means operatively connected with the said rocking contact and adapted to urge the said coöperative contacts together and apart with quick snap actions, the actuating means being disposed with relation to the movable contact to cause the actuating stress thereof to fall between the contact-bearings, and means for energizing said actuating means and for moving the same in a manner to throw the stress thereof from one to the other side of the axis of the contact-bearings.

14. In a circuit-controlling device, a suitable support, electrical contacts carried thereby, rocking electrical contacts electrically separated one from another, a bearing for each of said rocking contacts to permit each of the same to coöperate with the first-mentioned contacts, yielding actuating means operatively connected with the said rocking contacts, energizing means with which the said yielding actuating means is also operatively connected, means for moving said connections to cause the stress of the said yielding means to increase toward a dead-center and to be shifted across the line of axis of and between the said bearings to effect a snap opening and closing of the contacts.

15. In a circuit-controlling device, a suitable support, an electrical contact carried thereby, a rocking electrical contact adapted to coöperate with the first-mentioned contact, yielding actuating means operatively connected with the said rocking contact, energizing means with which the said yielding actuating means is also operatively connected, said parts providing a movement with greater yielding stress at the dead-center than in the closed position of the device whereby snap opening and closing thereof is effected, actuating means moving independent of the movable contact but acting with said energizing means to simultaneously shift both of the said operative connections of the yielding actuating means toward the dead-center of the said movement.

16. In a circuit-controlling device, a suitable support, an electrical contact carried thereby, a movable electrical contact adapted to coöperate with the first-mentioned contact, yielding actuating means operatively connected with the said movable contact, movable energizing means with which the said yielding actuating means is also operatively connected, means independent of said connection of said parts, for propelling said connection when opening the device, means for causing the said propelling means to operate after a prearranged initial movement of the said energizing means, and means for giving said yielding connections a relative movement to close the circuit with greater yielding power than is used to open the same.

17. In a circuit-controlling device, a suitable support, an electrical contact carried thereby, a movable electrical contact adapted to coöperate with the first-mentioned contact, yielding actuating means operatively connected with the said movable contact, energizing means with which the said yielding actuating means is also operatively connected, means independent of said connection of said part for urging the coöperative contacts apart after a prearranged initial movement of the said energizing means, means for giving said yielding connections a relative movement to close the circuit with greater yielding power than is used to open the same.

18. In a circuit-controlling device, a suitable support, an electrical contact carried thereby, a movable electrical contact adapted to coöperate with the first-mentioned contact, yielding actuating means for the said movable contact operatively connected therewith, movable energizing means with which the said yielding actuating means is also operatively connected, an operating-handle, means for giving said connections movement having a dead-center toward which the yielding stress increases to effect a snap opening and closing of the contacts, and means actuated by the handle and turning in a direction reverse thereto, said means moving independent of the movable contact and initiating the movement thereof.

19. In a circuit-controlling device, a suitable support comprising a base and a superimposed bearing-piece, an electrical contact carried thereby, a rocking electrical contact adapted to coöperate with the first-mentioned contact, yielding actuating means for the said rocking contact operatively connected therewith, energizing means with which the said yielding means is also connected for giving said connections movement having a dead-center toward which the yielding stress increases to effect a snap opening and closing of the contacts, and means on the said bearing-piece acting to initiate the movement of the point of connection of the yielding actuating means with the movable contact.

20. In a circuit-controlling device, a suitable support, an electrical contact carried thereby, a movable electrical contact adapted to coöperate with the first-mentioned contact, yielding actuating means operatively connected with the said movable contact to urge the said coöperative contacts together and apart, operating means bearing another operative connection of the said yielding means said second connection having a shiftable running-bearing on the said support providing movement of the parts with greater yielding stress at the dead-center than in the closed position of the device whereby the coöperative contacts are urged together and apart with quick snap actions.

21. In a circuit-controlling device, a suitable support, an electrical contact carried thereby, a movable electrical contact adapted to coöperate with the first-mentioned contact, yielding actuating means operatively connected with the said movable contact, pivotally-journaled energizing means with which the yielding actuating means is also operatively connected, said connection having an outbearing removed from the said pivotal bearing, and means whereby said yielding connections have a movement with a dead-center toward which the said tension increases to provide a snap opening and closing of the contacts.

22. In a circuit-controlling device, a suitable support comprising a base and a superimposed bearing-piece, an electrical contact carried thereby, a coöperative rocking electrical contact arranged between the base and the bearing-piece, yielding actuating means arranged between the said rocking contact and the base and operatively connected with that contact, energizing means arranged on the said bearing-piece and operatively connected with the said yielding actuating means, said yielding connections having a movement with a dead-center toward which the said tension increases to provide a snap opening and closing of the contacts.

23. In a circuit-controlling device, a suitable support, a rocking contact movable about substantially the central portion of said support, a coöperative fixed contact having a contacting surface arranged in a plane above the said central portion of the said support, said fixed contact being fastened to the said support circumferentially forward in the direction taken by the rocking contact when the circuit is broken, of its contacting surface and in a plane below the upper surface of the said central portion of the support, and means for effecting a snap opening and closing of the circuit.

24. In a circuit-controlling device, a suitable support, a rocking electrical contact having a plurality of contacting parts, a coöperative fixed contact arranged above the central portion of the said support, a second coöperative fixed contact arranged above the central portion of the said support and in a plane below the first-mentioned fixed contact, and which lower contact is secured to the said support in a plane below the said central portion of the latter and circumferentially forward, in the direction taken by the said rocking contact when the circuit is broken, and means for effecting a snap opening and closing of the circuit.

25. In a circuit-controlling device, a suitable support, a fixed contact arranged above the central portion of the said support, another fixed contact arranged above the central portion of the said support and in a plane below the first-mentioned contact, a fixed tongue of insulating material arranged between the said contacts, a web of insulating material between the said tongue and the said support, a rocking electrical contact, and means for effecting a snap opening and closing of the circuit.

26. In a circuit-controlling device, a suitable support, an electrical contact carried thereby, a contact movable about an axis into and out of engagement with the first-mentioned contact, insulation-barriers in juxtaposition to the path of the free end of the said movable contact, but permanently spaced therefrom providing a restricted passage-way between said contacts, on a portion of the path of the movable contact as it leaves the first-mentioned contact, and means for effecting a snap opening and closing of the circuit.

27. In a circuit-controlling device, a suitable support, an electrical contact carried thereby, a contact member movable about an axis into and out of engagement with the first-mentioned contact, and a barrier of insulation above the central portion of the said support, said barrier having a segmental channel open at the inner side thereof to permit movement of said movable contact therein, and means for effecting a snap opening and closing of the circuit.

28. In a circuit-controlling device, a suitable support, an electrical contact carried thereby, a contact member movable about an axis into and out of engagement with the first-mentioned contact, and an insulation-barrier permanently spaced from the said member and arranged radially without or beyond and in juxtaposition to a segment of the radial path described by the free end of said movable contact as the latter leaves the coöperative fixed contact, and means for effecting a snap opening and closing of the circuit.

29. In a circuit-controlling device, a suitable support, a contact providing a terminal for an electric circuit, a member moving about an axis and bearing a coöperative contact part, said member having movement free from sustained rubbing connection with the first-mentioned contact and carrying the said contacting part into and out of engagement with the said first contact, yielding actuating means operatively connected with the said movable member, movable energizing means with which the said yielding actuating means is also operatively connected, means for relatively moving said yieldingly-connected parts to effect a snap opening and closing of the contacts, and a segmental arc-restricting barrier radially beyond and also at one side of the path of the free end of said movable contact as it leaves the said first contact.

30. In a circuit-controlling device, a suitable support, a stationary spring-contact, a member moving about an axis and bearing a coöperative contact part movable into and out of engagement with the said spring-contact, yielding actuating means operatively connected with the said movable member, movable energizing means with which the said yielding actuating means is also operatively connected, means for relatively moving said yieldingly-connected parts to affect a snap opening and closing of the contacts, and a segmental portion of insulation about and in juxtaposition to the path traveled by the free end of the said movable contact when it leaves the said stationary contact.

31. In a circuit-controlling device, a suitable support, an electrical contact carried thereby, a contact member movable about an axis into and out of engagement with the first-mentioned contact, and insulating material arranged below, radially beyond, above, and in juxtaposition to the path of the free end of the said movable contact member but permanently spaced therefrom and, forming an arc-restricting inclosure on a portion of the path of the movable contact as it leaves the first-mentioned contact, thereby permitting movement of said movable contact therein, and means for effecting a snap opening and closing of the circuit.

32. In a circuit-controlling device, a suitable support, coöperative contacts carried thereby said contacts having relative movement and means for effecting a "knife" closure of the circuit, yielding actuating means operatively connected with one of the said contacts, movable energizing means with which the said yielding actuating means is also operatively connected, means for relatively moving said yieldingly-connected parts to effect a snap opening and closing of the contacts, and insulating material arranged in juxtaposition to the path of the free end of the said movable contact but permanently spaced therefrom and forming an arc-restricting inclosure permitting free movement of the said movable contact therein when the circuit is being opened.

33. In a circuit-controlling device, a suitable support, a fixed contact on the support, a contact member movable about an axis into and out of engagement with the fixed contact, arc-restricting barriers radially within, radially beyond, and in juxtaposition to the path traveled by the contacting portion of the said movable contact as the latter leaves the said fixed contact, said contact member having movement free from rubbing connection with the said barriers, and means for effecting a snap opening and closing of the circuit.

34. In a circuit-controlling device, a suitable support, a fixed contact on the support, a contact movable about an axis into and out of engagement with the fixed contact, an arc-restricting barrier of insulation movable with said second contact and exposing only the extremity thereof to the coöperative fixed contact, and arc-restricting barriers of insulation radially beyond, below, and above a portion of the path traveled by the free end of the said movable contact when it leaves the said fixed contact said barriers being in juxtaposition to but permanently spaced from the said movable parts, and means for effecting a snap opening and closing of the circuit.

35. In a circuit-controlling device, a suitable support, fixed contact on the support, a contact movable about an axis into and out of engagement with the fixed contact, an inclosure of insulating material about and in juxtaposition to that segment of the path traveled by the movable contact as the latter leaves the said fixed contact, the said inclosure having an opening on at least one side to admit the end of the movable contact, and means for effecting a snap opening and closing of the circuit.

Signed at Washington, District of Columbia, April 15, 1906.

JULIUS K. LUX.

Witnesses
C. M. FORREST,
C. F. TONER